United States Patent
Gami et al.

(10) Patent No.: US 7,423,831 B2
(45) Date of Patent: Sep. 9, 2008

(54) UTILIZATION OF THE ACCELERATION ZONE IN AMMONITE SERVO WRITING

(75) Inventors: Bipinchandra V. Gami, Northridge, CA (US); Yih Hurng Jung, Santa Clara, CA (US); Hao Ping Wen, Sunnyvale, CA (US); Kwong-Tat Chan, Pleasanton, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 129 days.

(21) Appl. No.: 11/582,924

(22) Filed: Oct. 17, 2006
(Under 37 CFR 1.47)

(65) Prior Publication Data
US 2008/0170323 A1 Jul. 17, 2008

(51) Int. Cl.
*G11B 21/02* (2006.01)
(52) U.S. Cl. ........................................ 360/75
(58) Field of Classification Search ............... 360/75, 360/53, 60, 77.07, 73.03, 69; 369/47.44, 369/47.42; 91/196
See application file for complete search history.

(56) References Cited
U.S. PATENT DOCUMENTS

| | | | |
|---|---|---|---|
| 6,779,432 B2 * | 8/2004 | Sakaki | 91/196 |
| 6,879,454 B2 * | 4/2005 | Winarski et al. | 360/60 |
| 6,967,913 B2 * | 11/2005 | Okamoto et al. | 369/47.44 |
| 7,158,328 B2 * | 1/2007 | Fayeulle | 360/73.03 |
| 7,209,312 B1 * | 4/2007 | Sutardja | 360/77.07 |
| 7,215,497 B2 * | 5/2007 | Urata | 360/53 |
| 7,355,940 B2 * | 4/2008 | Yonezawa | 369/47.42 |

* cited by examiner

*Primary Examiner*—Fred Tzeng
(74) *Attorney, Agent, or Firm*—Ben J. Yorke; Irell & Manella LLP

(57) ABSTRACT

A method for writing servo information onto a disk of a hard disk drive with a servo writer. The method includes accelerating a head to a constant velocity across a disk. The disk being defined as having an acceleration zone and a constant velocity zone. The head is then used to write a spiral servo pattern in the constant velocity zone. A final servo pattern is written in the constant velocity zone using the spiral servo pattern. A servo reference pattern is also written in the acceleration zone. The servo reference pattern is used to write a final servo pattern in the acceleration zone. The final servo pattern may be copied using a run-out cancellation algorithm to improve the accuracy of the servo pattern in the acceleration zone.

12 Claims, 6 Drawing Sheets

UTILIZATION OF THE ACCELERATION ZONE IN AMMONITE SERVO WRITING

BACKGROUND OF THE INVENTION

1. Field of the Invention

The present invention relates to a method for writing servo onto disks of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and used to position the head 7 relative to the track. The fields 1-5 must be written onto the disk surfaces during the manufacturing process of the disk drive. These fields are typically written with a servo writer. The servo tracks are sometimes written using a number of spiral servo tracks initially written onto the disks. FIG. 2 shows an example of a disk with number of spiral servo tracks. Using spiral servo tracks is sometimes referred to as an Ammonite servo write process. The spiral servo tracks are used to write the final radial servo tracks that are utilized during the normal operation of the disk drive. This process is described in U.S. Pat. No. 5,668,679 issued to Swearingen et al.

As shown in FIG. 3, the disk has a plurality of spiral servo patterns incrementally spaced across the surface of the disk. To write servo the servo writer reads the disk to detect a spiral servo signal. The servo writer uses the detected spiral servo signal to time the writing of a permanent A, B, C and D servo burst pattern.

The write heads can be moved by a push-pin that pushes an actuator attached to the heads. The heads of the servo writer are accelerated from a rest position to a constant velocity. The servo writer does not begin to write the spiral servo pattern until the head reaches a constant velocity. This results in an "acceleration" zone of the disk that does not contain servo. It is possible to write a final 4-burst servo pattern in the acceleration zone but because of disk run-out the servo is not very accurate. It would be desirable to fill the acceleration zone of the disk with accurate 4-burst servo patterns.

BRIEF SUMMARY OF THE INVENTION

A method for writing servo onto a disk of a hard disk drive. The method includes moving a actuator arm so that a head accelerates and then reaches essentially a constant velocity. The head moves from an acceleration zone to a constant velocity zone on the disk. A spiral servo pattern is written in the constant velocity zone. A final servo pattern is written in the constant velocity zone with the spiral servo pattern and a servo reference pattern is written in the acceleration zone of the disk. A final servo pattern is then written in the acceleration zone using the servo reference pattern.

DETAILED DESCRIPTION

Disclosed is a method for writing servo information onto a disk of a hard disk drive with a servo writer. The method includes accelerating a head to a cosntant velocity across a disk. The disk being defined as having an acceleration zone and a costant velocity zone. The head is then used to write a spiral servo pattern in the constant velocity zone. A final servo pattern is written in the constant velocity zone using the spiral servo pattern. A servo reference pattern is also written in the acceleration zone. The servo reference pattern is used to write a final servo pattern in the acceleration zone. The final servo pattern may be copied using a run-out cancellation algorithm to improve the accuracy of the servo pattern in the acceleration zone.

Figure 4:
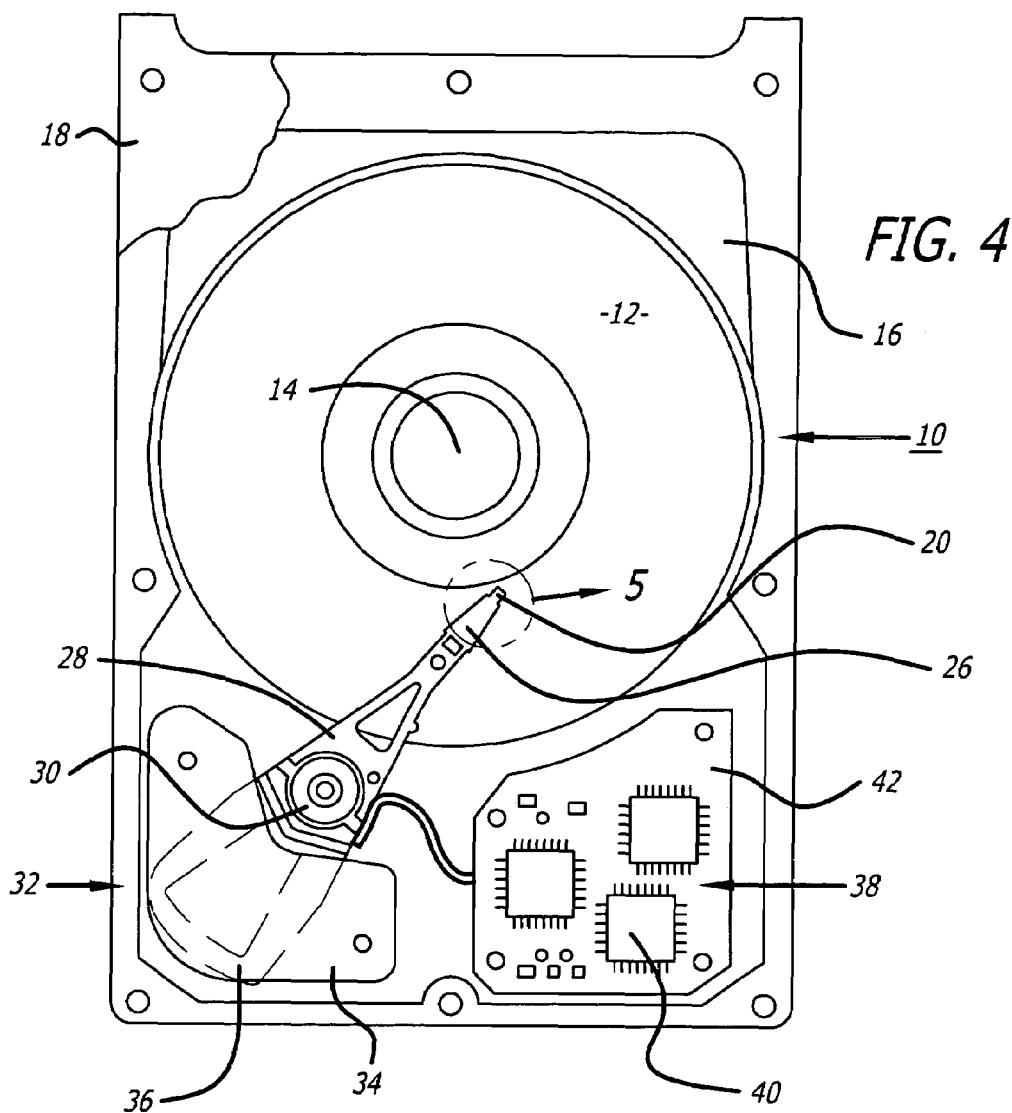
FIG. 4 is a top view of an embodiment of a hard disk drive.

Referring to the drawings more particularly by reference numbers, FIG. 4 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 5:
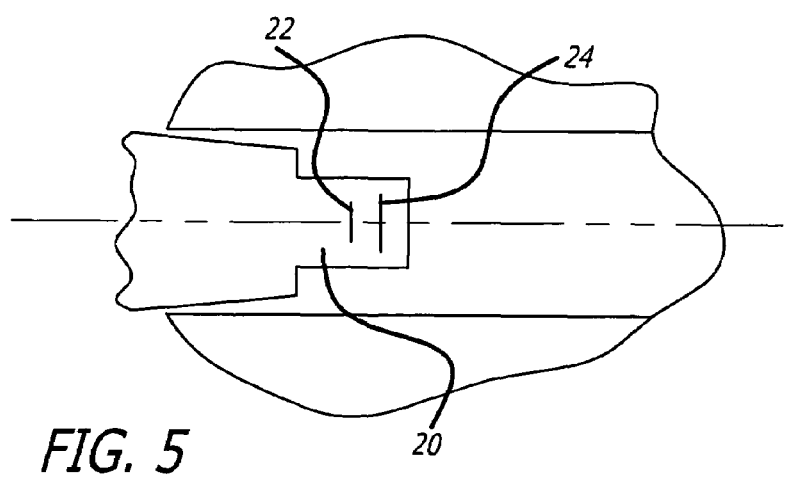
FIG. 5 is a top enlarged view of a head of the hard disk drive.

The disk drive 10 may include a plurality of heads 20 located adjacent to the disks 12. As shown in FIG. 5 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 4, each head 20 may gimbal mounted to a flexure arm 26 as part of a head gimbal assembly (HGA). The flexure arms 26 are attached to an actuator qrm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 6:
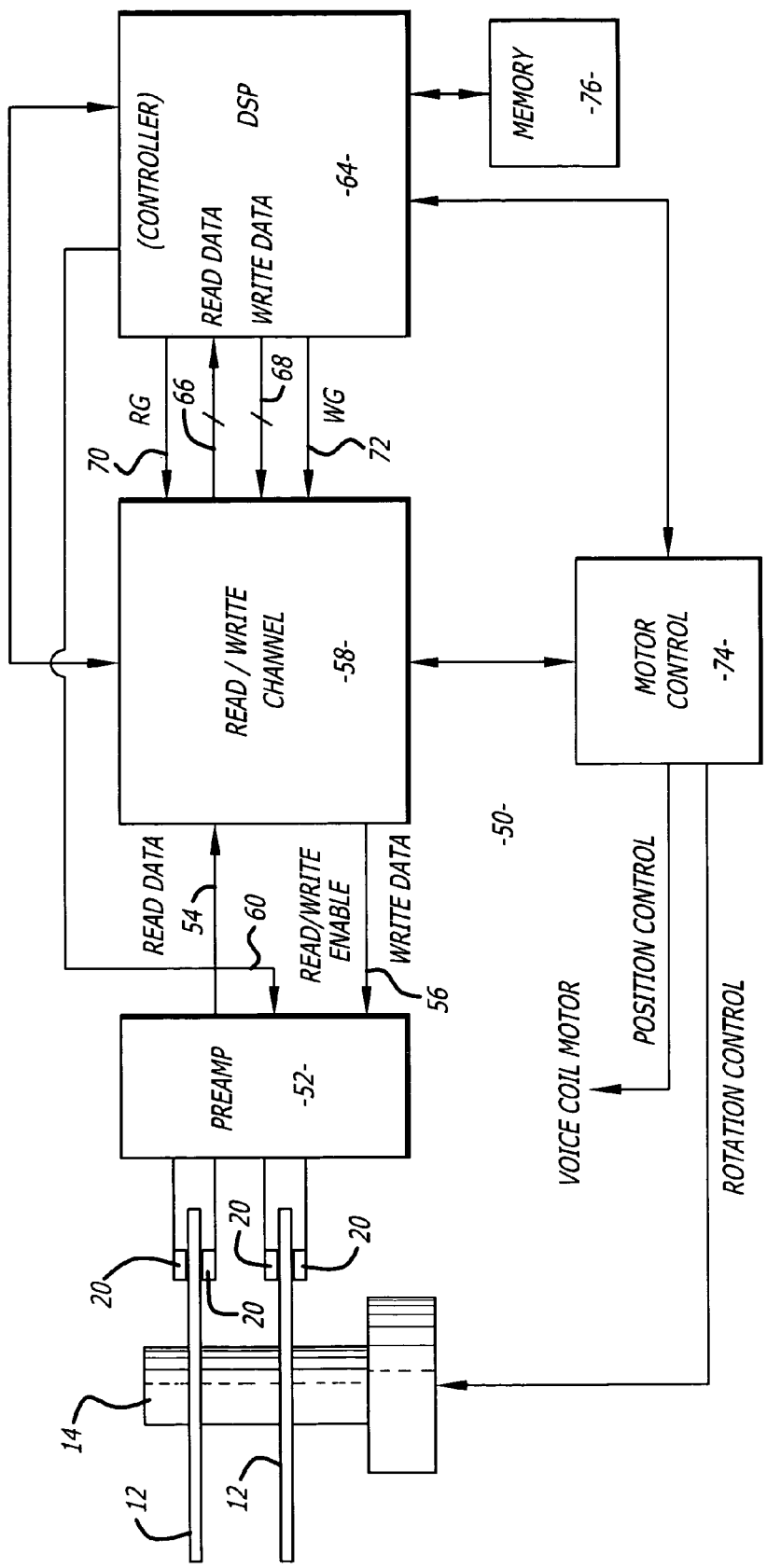
FIG. 6 is a schematic of an electrical circuit for the hard disk drive.

FIG. 6 shows an electrical circuit 50 for reading and writing data onto the disk 12. The circuit 50 may include a pre-amplifier circuit 52 that is coupled to the heads 20. Each disk 21 may included a first head 20A and a second head 20B. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 7:
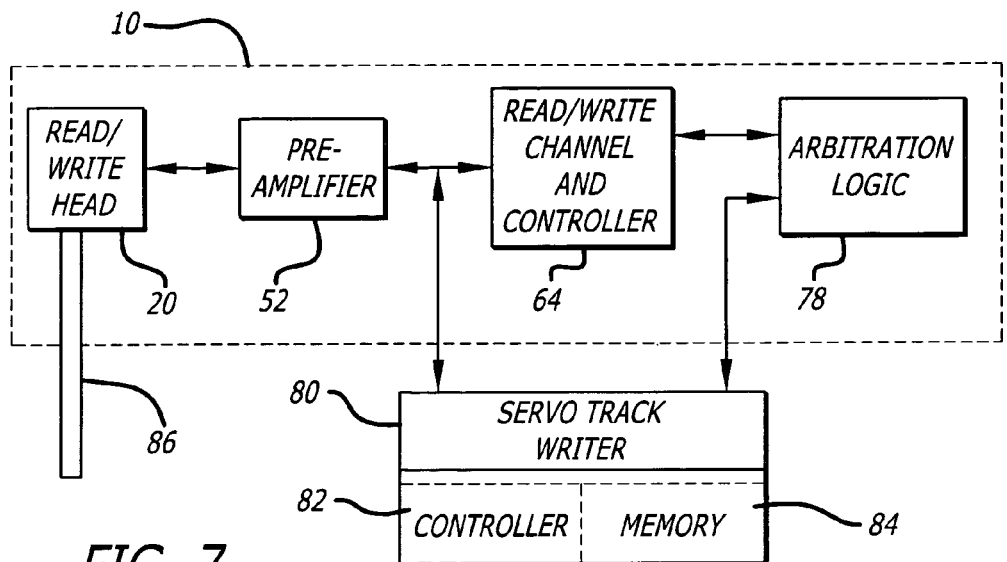
FIG. 7 is a schematic showing a servo writer connected to the hard disk drive.

During the manufacturing process of the disk drive 10 servo information must be written onto the disks 12. This is typically done with a servo track writer 80. FIG 7 shows a servo track writer 80 connected to a hard disk drive 10. The servo track writer 80 may include a controller 82, memory 84 and other circuitry for writing servo information onto the disk(s) of the disk drive. The servo writer 80 may utilize the pre-amplifier, read/write channel, etc. of the disk drive to write servo information. The servo writer 80 may also employ the circuits of the disk drive to read servo information and position a head onto a track of the disk(s). The heads are typically pushed across the disk by a pin 86 of the servo writer.

Figure 1:
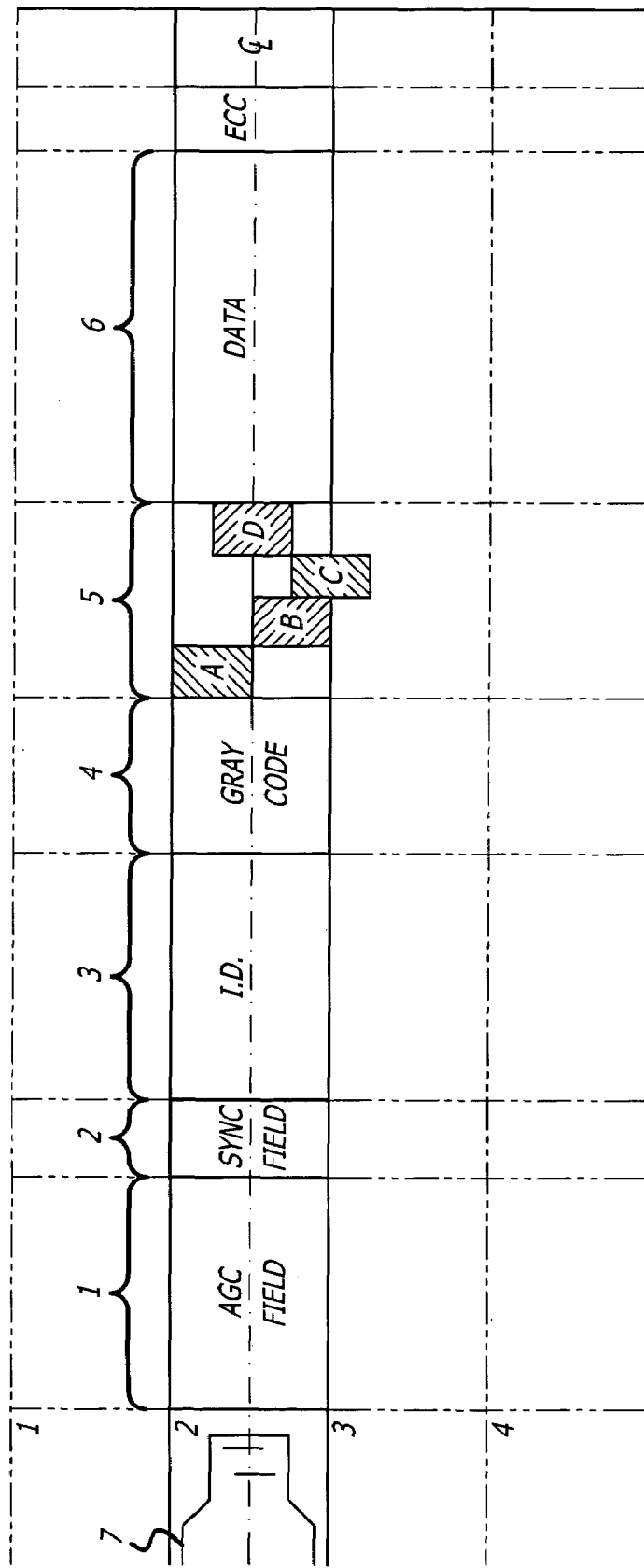
FIG. 1 is an illustration of a track of the prior art.
Figure 2:
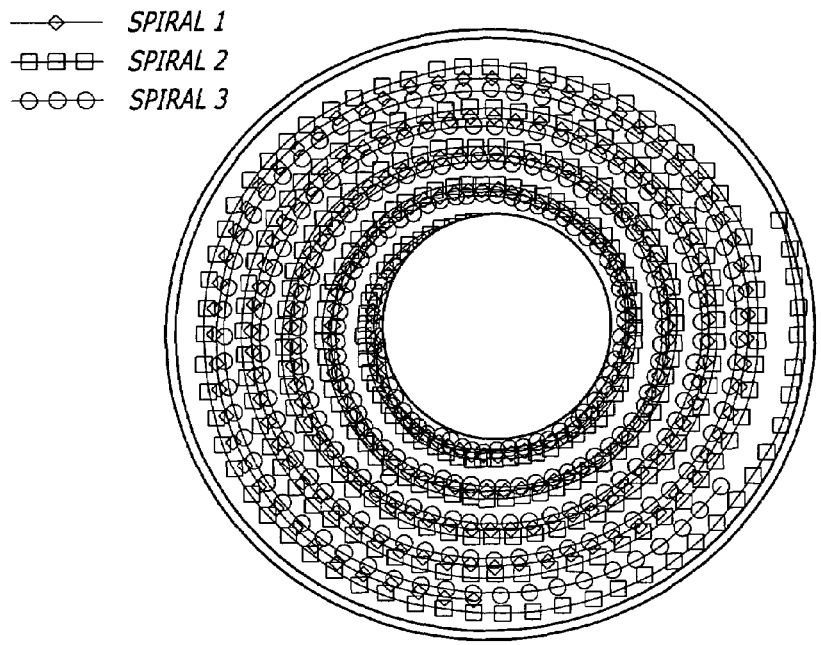
FIG. 2 is an illustration showing a plurality of spiral servo tracks written onto a disk in the prior art.
Figure 3:
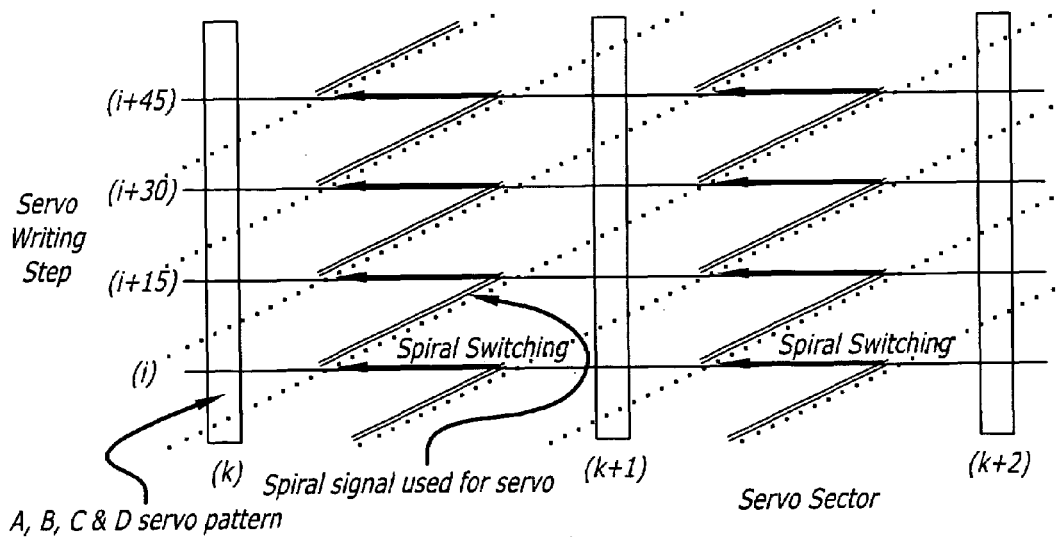
FIG. 3 is an illustration showing a plurality of spiral servo patterns used to write A, B, C and D servo bit patterns.
Figure 8:
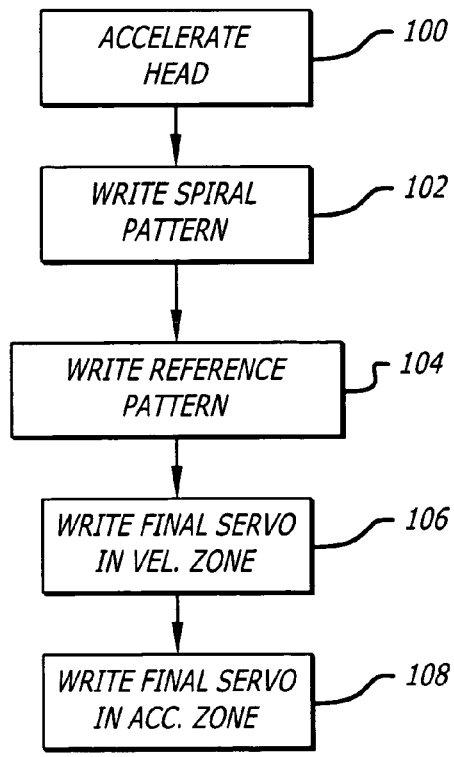
FIG. 8 is a flowchart describing a process to write a servo pattern onto a disk of the drive.
Figure 9:
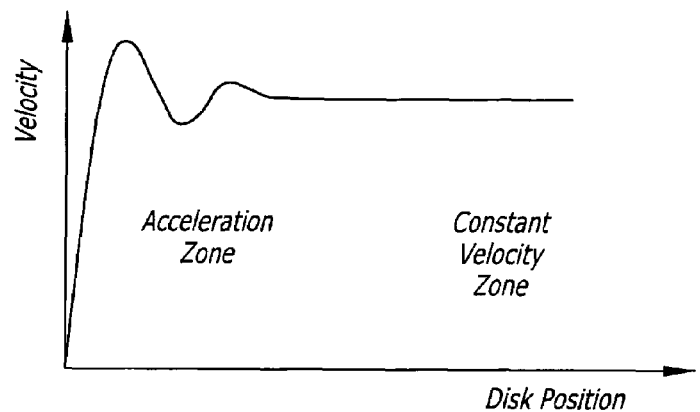
FIG. 9 is a graph showing head velocity versus a disk position.

FIG. 8 is a flowchart describing the writing of servo patterns onto the disk(s) with the servo track writer. In block 100 the heads of the servo writer are accelerated to a constant velocity. The velocity of the heads relative to a position on the disks is shown in FIG 9. The movement of the heads creates an acceleration zone and a constant velocity zone. Referring again to FIG. 8, in block 102 the servo writer causes the disk drive to write a spiral servo pattern such as the pattern shown in FIGS. 2 and 3. The writing of the spiral servo pattern may the same of similar to the process described in U.S. Pat. No. 5,668,679 issued to Swearingen et al., which is hereby incorporated by reference. The spiral servo pattern can be written using a servo address mark. The spiral pattern is only written in a constant velocity zone of the disk. The spiral pattern does not occur in an acceleration zone of the disk.

In block 104 a 4-burst servo reference pattern is written in an acceleration zone. In block 106 a final 4-burst servo pattern in written in the constant velocity zone using the spiral servo pattern. The servo in the spiral pattern provide synchronization markers for writing the final pattern.

In block 108 the final 4-burst servo pattern is written in the acceleration zone using the reference servo pattern. The final servo pattern can be created using a servo address mark different from the mark used for the spiral pattern. The final pattern can be created utilizing postion error signals ("PES") generated by reading the reference servo pattern.

Figure 10:
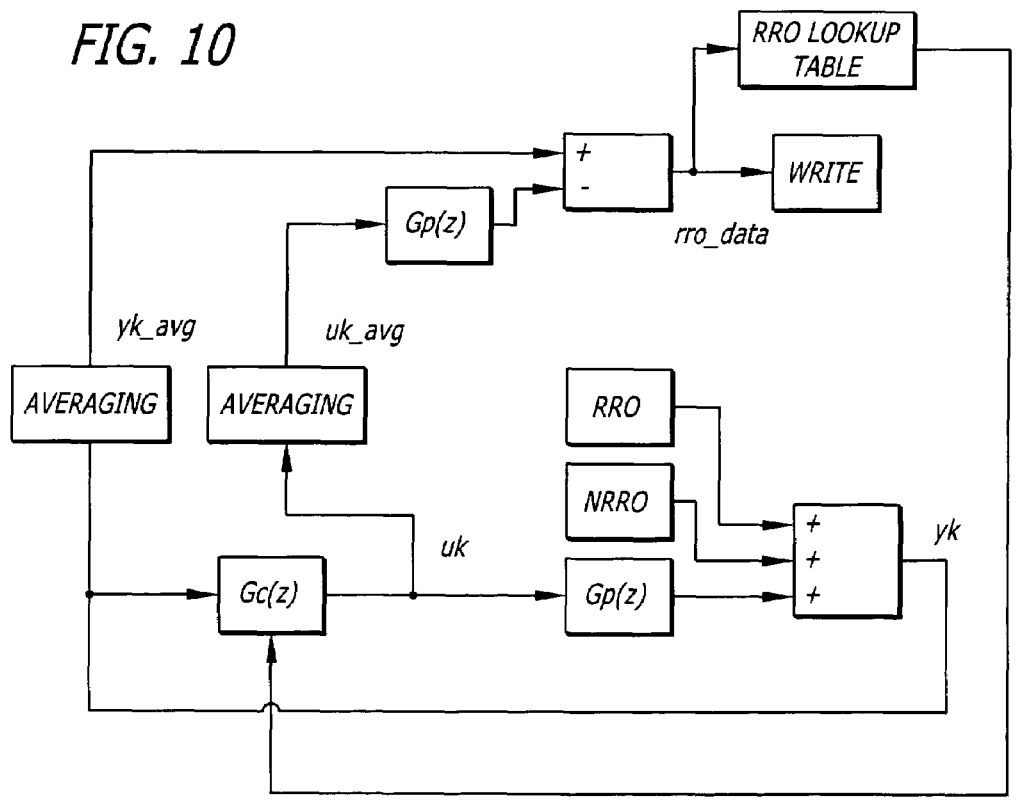
FIG. 10 is a schematic of a servo control loop that cancels run-out.

By way of example, PES signals for repeatable runout RPO can be generated and corrected using the servo loop shown in FIG. 10 and described by the following equations;

$$rro_{(z)} = yk_{AVG}(z) - G_{(p)}\mu k_{AVG}(z) \qquad (1)$$

where;
$G_{c(z)}$=the transfer function of the controller,
$G_{p(z)}$=the transfer function of the plant dynamics,
yk=the position error signal (PES),
rro=the repeatable runout on the disk,
nrro=the non-repeatable runout on the disk,
$rro_{(z)}$=the corrected RRO data.

The following equation can be used to iteratively update the RRO data:

$$rck_{k+1}(i) = rcd_k(i) + \lambda * rro(i), 0 \leq i \leq \text{servo\_sector\_max} \qquad (2)$$

$\lambda$ (0, 1, 2 . . . ) is n update constant.

Copying the final servo pattern using a run-out cancellation algorithm improves the accuracy of the servo in the acceleration zone.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for writing servo information onto a disk of a hard disk drive, comprising:
    moving an actuator arm so that a head accelerates and then reaches essentially a constant velocity, the head moves from an acceleration zone to a constant velocity zone on the disk;
    writing a spiral servo pattern with the head in the constant velocity zone;
    writing a final servo pattern in the constant velocity zone using the spiral servo pattern and a servo reference pattern in the acceleration zone of the disk; and,
    writing a final servo pattern in the acceleration zone using the servo reference pattern.

2. The method of claim 1, wherein the final servo pattern written in the acceleration zone is written using a run-out cancellation algorithm.

3. The method of claim 1, wherein the head is pushed by a pin.

4. The method of claim 1, wherein the reference servo pattern includes 4-burst servo patterns and a first servo address mark.

5. A servo writer that writes servo information onto a disk of a hard disk drive that has a head and a disk, comprising:
    a controller that causes; the head to accelerate and then reach an essentially constant velocity, such that the head moves from an acceleration zone to a constant velocity zone on the disk, a writing of a spiral servo pattern with the head in the constant velocity zone, a writing of a final servo pattern in the constant velocity zone using the spiral servo pattern and a servo reference pattern in the acceleration zone of the disk, and a writing of a final servo pattern in the acceleration zone using the servo reference pattern.

6. The servo writer of claim 5, wherein the final servo pattern written in the acceleration zone is written using a run-out cancellation algorithm.

7. The servo writer of claim 5, further comprising a pin that pushes the head.

8. The servo writer of claim 5, wherein the reference servo pattern includes a plurality of 4-burst servo patterns.

9. A servo writer that writes servo information onto a disk of a hard disk drive that has a head and a disk, comprising:
controller means for causing; the head to accelerate and then reach an essentially constant velocity, such that the head moves from an acceleration zone to a constant velocity zone on the disk, a writing of a spiral servo pattern with the head in the constant velocity zone, a writing of a final servo pattern in the constant velocity zone using the spiral servo pattern and a servo reference pattern in the acceleration zone of the disk, and a writing of a final servo pattern in the acceleration zone using the servo reference pattern.

10. The servo writer of claim 9, wherein the final servo pattern written in the acceleration zone is written using a run-out cancellation algorithm.

11. The servo writer of claim 9, further comprising a pin that pushes a head.

12. The servo writer of claim 9, wherein the reference servo pattern includes a plurality of 4-burst servo patterns.

* * * * *